(12) United States Patent
Parmley

(10) Patent No.: US 7,411,308 B2
(45) Date of Patent: Aug. 12, 2008

(54) RENEWABLE ENERGY POWER SYSTEMS

(76) Inventor: Daniel W. Parmley, 5045 S. 33rd St., Phoenix, AZ (US) 85040

(*) Notice: Subject to any disclaimer, the term of this patent is extended or adjusted under 35 U.S.C. 154(b) by 138 days.

(21) Appl. No.: 11/361,490

(22) Filed: Feb. 25, 2006

(65) Prior Publication Data

US 2006/0192435 A1 Aug. 31, 2006

Related U.S. Application Data

(60) Provisional application No. 60/656,622, filed on Feb. 26, 2005, provisional application No. 60/701,610, filed on Jul. 23, 2005.

(51) Int. Cl.
*H02J 1/00* (2006.01)
(52) U.S. Cl. ...................................... 290/1 R
(58) Field of Classification Search ................... 290/1 R
See application file for complete search history.

(56) References Cited

U.S. PATENT DOCUMENTS

| | | | | |
|---|---|---|---|---|
| 3,070,703 A | * | 12/1962 | Podolny | 290/2 |
| 3,336,162 A | * | 8/1967 | Zachmann | 429/8 |
| 6,011,324 A | * | 1/2000 | Kohlstruck et al. | 307/64 |
| 6,703,722 B2 | * | 3/2004 | Christensen | 307/71 |
| 6,879,052 B1 | * | 4/2005 | Johnson | 290/1 A |
| 6,930,402 B1 | * | 8/2005 | Johnson et al. | 290/1 R |
| 6,987,670 B2 | * | 1/2006 | Ahmed et al. | 361/699 |
| 7,081,687 B2 | * | 7/2006 | Johnson | 290/1 A |
| 7,112,891 B2 | * | 9/2006 | Johnson et al. | 290/1 A |
| 7,244,524 B2 | * | 7/2007 | McCluskey et al. | 429/9 |
| 7,245,032 B2 | * | 7/2007 | Willets et al. | 290/1 A |
| 7,245,034 B2 | * | 7/2007 | Johnson | 290/1 A |
| 2006/0066105 A1 | * | 3/2006 | Johnson et al. | 290/1 A |

FOREIGN PATENT DOCUMENTS

EP 486130 A2 * 5/1992
JP 11308785 A * 11/1999

OTHER PUBLICATIONS

US 6,184,583, 02/2001, Jungreis (withdrawn)*

* cited by examiner

*Primary Examiner*—Joseph Waks
(74) *Attorney, Agent, or Firm*—Keith L. Jenkins, Registered Patent Attorney. LLC; Keith L. Jenkins

(57) ABSTRACT

Rapidly responsive energy storage means enable the creation of a multi-port DC bus in a UPS, enabling the multi-port DC bus to couple a plurality of intermittent DC sources and intermittent DC loads. The invention includes renewable energy power systems with a UPS having a multi-port DC bus and a responsive energy storage means electrically coupled to the multi-port DC bus. An embodiment includes a renewable energy power system with a UPS having a multi-port DC bus having at least one coupling in addition to the minimum of three required for a UPS to operate. The additional coupling is adapted to couple either a DC load or a DC source to the multi-port DC bus. A responsive energy storage means is coupled to supply power to the multi-port DC bus and is operable to maintain a substantially constant power level on the multi-port DC bus.

22 Claims, 1 Drawing Sheet

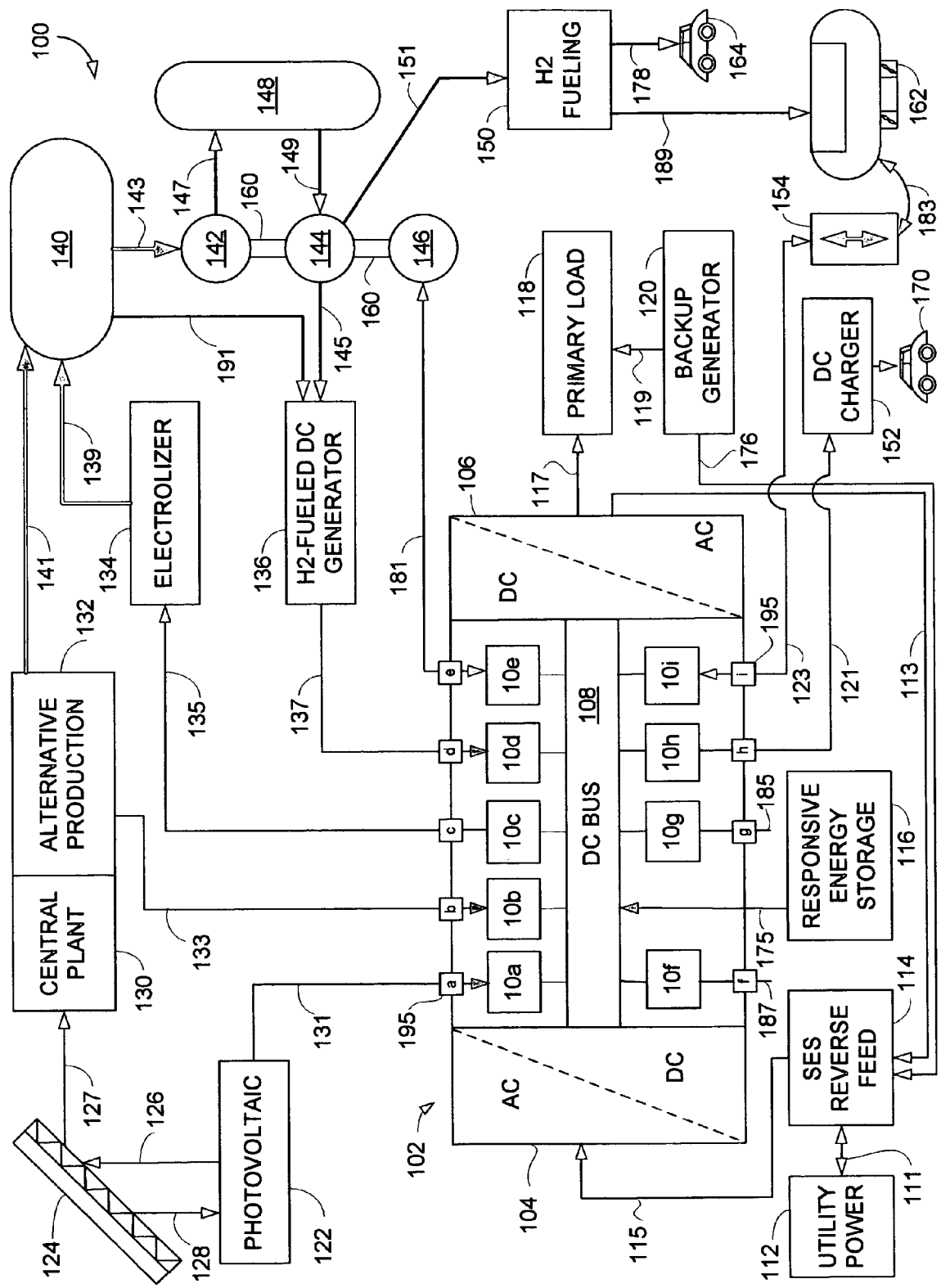

RENEWABLE ENERGY POWER SYSTEMS

RELATED APPLICATIONS

The present application is related to and claims priority from prior provisional application Ser. No. 60/656,622 filed Feb. 26, 2005, entitled "RENEWABLE ENERGY POWER SYSTEMS", the contents of which are incorporated herein by this reference and are not admitted to be prior art with respect to the present invention by the mention in this cross-reference section. The present application is also related to and also claims priority from prior provisional application Ser. No. 60/701,610 filed Jul. 23, 2005, entitled "RENEWABLE ENERGY POWER SYSTEMS", the contents of which are incorporated herein by this reference and are not admitted to be prior art with respect to the present invention by the mention in this cross-reference section.

FIELD OF THE INVENTION

The present invention relates to systems for incorporating renewable energy systems into existing power systems. The present invention further relates to an uninterruptible power supply (UPS) with more than the minimum of three couplings required for a UPS, wherein the additional coupling may be used for coupling direct current (DC) loads and sources. The present invention further relates to integration of hydrogen generation means within a renewable energy power system.

BACKGROUND OF THE INVENTION

Many commercial power consumers, such as hospitals and computer facilities require continuous backup electrical power. Existing systems use a UPS, consisting of a converter for changing commercial alternating current (AC) power to DC power. The output of the converter is coupled to a DC bus to which is also coupled battery backup power. Finally, the DC bus is coupled at its output to an inverter for converting DC into AC. The AC output of the UPS supplies a primary load, and if the commercial power fails, even momentarily, the batteries support the primary load until an emergency generator can be staffed and coupled to the primary load. Thus, seamless compensation for a failure of commercial power is provided.

Batteries are expensive to purchase and maintain, and create significant environmental challenges and expenses upon disposal. Some modern systems use flywheel generators for providing temporary DC power in place of batteries. Some flywheels are made of steel and require about 3000 watts to operate in a steady state. These steel flywheels typically have recovery times substantially longer than their power production periods, making them unresponsive to repeated interruptions and variations in input power.

Current power systems, which seek to integrate various renewable-energy sources of power such as, without limitation, solar photovoltaic (PV), wind, geothermal, bio-diesel generators, and hydro systems, require significant infrastructure for connectivity and power conditioning. In renewable energy power systems that seek to exploit multiple sources of renewable energy, the costs can be commercially prohibitive. Typically, each separate renewable energy power source has it own infrastructure for producing AC current and synchronizing the phase or phases with the AC power line current. Even with systems using only a few sources, the significant infrastructure requirements impose undesirable initial costs and maintenance costs. Accordingly, what is needed are renewable energy power systems with reduced infrastructure, higher capacity for handling a variety of loads and sources, and which can be easily integrated into commercial power systems.

Modern hydrogen gas production systems based on electrolyzers are stand-alone systems with both high-pressure and low-pressure storage tanks. While a significant amount of energy is required to compress the hydrogen gas for storage, much of that energy is wasted because the storage pressure is much higher than many (but not all) end-user pressure tanks. For example, a hydrogen production facility may store hydrogen at approximately 7000 psi while hydrogen-fueled vehicles may store hydrogen at 4500 psi.

The 2500 psi difference is much more than is needed to overcome conduit losses. Accordingly, what is needed are hydrogen gas production systems that are integrated with electrical renewable energy power systems and which permit recovery of some of the otherwise wasted pressure differential pressure energy in the stored hydrogen gas.

To meet the above-mentioned needs and to solve the above-mentioned problems, applicants present what follows.

BRIEF SUMMARY OF THE INVENTION

One embodiment of the present invention provides an uninterruptible power supply (UPS) with a novel multi-port DC bus having a rapidly responsive energy storage means 116 coupled thereto for maintaining level power and a plurality of additional ports for coupling various DC loads and DC sources to the multi-port DC bus within the UPS. Another embodiment has one of the plurality of additional ports coupled to an electrolyzer for producing hydrogen gas from water and DC power. The hydrogen gas is pumped to high-pressure storage and, when released to a significantly lower pressure end-user tank, is routed through a variable-vane turbine that runs a motor-generator in generation mode to put DC power back on the multi-port DC bus in the UPS. Another embodiment can put power back into a commercial power grid through a backup generator, such as a bio-diesel generator; from a hydrogen-fueled generator, which may be a fuel cell or a hydrogen-fueled motor driving a DC generator; or from any of various other sources of DC power coupled to the multi-port DC bus in the UPS in various embodiments.

BRIEF DESCRIPTION OF THE DRAWING

The above and other objects and advantages of the present invention will become more apparent from the following description taken in conjunction with the following drawing in which:

The FIGURE is a block diagram view illustrating an exemplary embodiment of the renewable energy power systems according to the present invention

DETAILED DESCRIPTION OF THE DRAWING

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Turning now to the FIGURE, the exemplary embodiment of renewable energy power system 100 includes a UPS core 102 having a multi-port DC bus 108 featuring a plurality ports 195(a-i) (labeled by example) for coupling DC power lines 121, 123, 131, 133, 135, 137, 181, 187, 185, 121, and 123, respectively, to the multi-port DC bus 108 through regulators 10a-10i, respectively. (Two of the DC power lines are shown as spare DC power lines 185 and 187.) A "port" 195, as defined and used herein, is a power coupling to the multi-port DC bus 108 for a DC load or a DC source. The port may or may not couple through a regulator, such as one of regulators 10a-10i. A "multi-port DC bus" 108, as defined and used herein, is a DC bus having more power couplings than the minimum of three that are required for operation as a UPS: a first necessary coupling for the converter 104, a second necessary coupling for the inverter 106, and a third necessary coupling for the responsive energy storage means 116. Furthermore, the definition of "multi-port DC bus" 108 includes that the power couplings, which are additional to the necessary minimum of three, are accessible though ports on an exterior portion of the UPS core 102. Note that, in some commercially available UPSs, the three necessary couplings may not be discrete components. "Responsive energy storage means 116" and particular examples thereof, as defined and used herein, are energy storage devices operable to store power, operable to supply that stored power in response to a power drop on the multi-port DC bus 108, and operable thereafter to re-store an amount of energy equal to that just supplied in approximately the same period of time that it supplied that power. By "approximately equal" as used and defined herein, a re-store period less than or equal to 115% of the discharge period is considered "approximately equal". Upon reading the teachings of this specification, those with ordinary skill in the art will now understand that, under appropriate circumstances, considering such issues as available energy sources, required energy loads, convenience, economics, user preference, etc., other configurations of multi-port DC buses 108, such as having more or fewer ports (but at least one externally accessible port), more or fewer regulators, more discrete or more integrated components, etc., may suffice.

The exemplary embodiment of renewable energy power system 100 further includes backup generator 120, which is preferably a bio-diesel engine-generator set producing AC power on AC power line 119 to the primary load 118 when signaled to produce power for the primary load 118. In various embodiments, engine-generator sets using different fuels may be used for backup generator 120. For example, backup generator 120 may run on hydrogen. Backup generator 120 may also operate to produce AC power on AC power line 176 when signaled to do so. AC power line 176 may couple the backup generator 120 to the reverse feed switch 114 of power system 100, which can couple AC power output to a commercial utility company's AC utility power grid 112 over AC power line 111, as shown. AC power line 115 may couple power from the AC power grid 112 to the input of the UPS core 102, as shown. The AC output of the UPS core 102 may alternatively be supplied to the reverse feed switch 114 over AC power line 113, as shown. Upon reading the teachings of this specification, those with ordinary skill in the art will now understand that, under appropriate circumstances, considering such issues as available backup generators, required energy loads, convenience, economics, user preference, etc., other configurations for routing AC power, such as having a switchable coupling to bypass the UPS core 102, if it should fail, and supply utility power 112 directly to the primary load 118, etc., may be appropriate.

The UPS core 102 comprises an AC/DC converter 104 supplying DC power to a multi-port DC bus 108, which supplies DC power to DC/AC inverter 106. The AC output of DC/AC inverter 106 supplies the primary load 118 over AC power line 117, as shown. The multi-port DC bus 108 may have a regulator, such as one of regulators 10a-10i, for each DC power line 121, 123, 131, 13, 135, 137, 185, 187, and 181, coupled to the multi-port DC bus 108 for voltage regulation and current limiting. If a particular power source or load is self-regulating, a corresponding particular separate regulator 10a-10i may be omitted. In general, each renewable energy power system 100 should have no more components than are actually needed in a particular application. Likewise, the entire structure of the UPS core 102 and responsive energy storage means 116 should be environmentally sound as well as electrically effective. Upon reading the teachings of this specification, those with ordinary skill in the art will now understand that, under appropriate circumstances, considering such issues as available space, ambient environment, convenience, economics, user preference, etc., various configurations of UPS core 102 and responsive energy storage means 116, such as including thermal control structures, vibration dampers, waterproofing, etc., may be appropriate.

Exemplary embodiment of renewable energy power system 100 further includes rapidly responsive energy storage means 116. Responsive energy storage means 116 operates to rapidly make up any drop in utility power 112 that impacts the input to multi-port DC bus 108 from converter 104. Responsive energy storage means 116 also operates to level any drop in photovoltaic power from PV array 122, any drop in alternative power from source 132, any drop in generator power from hydrogen-fueled DC generator 136, any drop in power from motor-generator 146, any drop in power through bi-directional coupling 154, or any drop in power through any other port. The supply-drop leveling occurs until either the commercial utility power 112 reacts to compensate for the drop or the backup generator 120 begins operation. For example, if responsive energy storage means 116 supplies 20 seconds of power from a fully ready state in response to the power grid 112 failing or the photovoltaic 122 power dropping due to a cloud, the responsive energy storage means 116 will return to the fully ready state in approximately 20 seconds. In order to provide constant power output from the UPS core 102 while serving a wide range of intermittent power sources and loads connected to the DC bus 108, the system must have the capacity to rapidly compensate for falls in the net power level going from the multi-port DC bus 108 into the inverter 106. With a plurality of intermittent renewable energy sources and loads connected to multi-port DC bus, several drops in power production may occur in a short period of time. The ability to level these variations is critical to the proper functioning of the UPS core 102. Accordingly, the development of rapidly responsive energy storage means 116 enables the present invention, which applicant believes was first discovered by applicant. Preferably, the UPS core 102 and responsive energy storage means 116 are sized and configured to supply all loads from commercial utility power 112, and the addition of power from alternative sources 122, 133, 136, 146, and 162 reduces the amount of commercial utility power 112 consumed. Upon reading the teachings of this specification, those with ordinary skill in the art will now understand that, under appropriate circumstances, considering such issues as component cost, operational requirements, convenience, economics, user preference, etc., various configurations of UPS core 102 and responsive energy storage means 116, such as having multiple and/or various responsive energy storage means 116 coupled to the UPS core 102, having a load distribution logic to drop lower priority loads during low power production periods, having a power leveling logic to reduce demand for utility power 112 during high alternative energy production periods, etc., may be appropriate.

A comparatively new type of flywheel generator with a flywheel made of carbon fiber and available from Pentadyne Power Corporation of Chatsworth, Calif. requires only about 120 watts to operate in a steady state and has a recovery time approximately equal to its power production period. The present inventor has discovered that the rapidly responsive flywheel generator from Pentadyne can maintain bus voltage and power against a series of variations in input power and load. Each flywheel generator can produce about 120 kW. Multiple Pentadyne flywheel generators can be ganged together to handle larger loads. Accordingly, responsive energy storage means 116 may include Pentadyne flywheel generators.

Banks of ultra capacitors, produced by Maxwell Technologies of San Diego, Calif., can also function as rapidly responsive energy storage means 116. The present inventor has discovered that a rapidly responsive ultra capacitor bank from Maxwell Technologies can maintain bus voltage and power against a series of variations in input power and load. Ultra capacitor banks having the same energy storage capacity as the Pentadyne flywheel have about the same acquisition cost and require only about 15 watts of power in the quiescent state. Ultra capacitors recharge in the same amount of time it takes to discharge them. Additionally, the ultra capacitor banks have the advantage of having no moving parts. Accordingly, responsive energy storage means 116 may include Maxwell Technologies ultra capacitors. Upon reading the teachings of this specification, those with ordinary skill in the art will now understand that, under appropriate circumstances, considering such issues as component cost, operational requirements, technology advances, convenience, economics, user preference, etc., various types of responsive energy storage means 116, such as larger capacity ultra capacitors, combinations of batteries, Pentadyne flywheels, and Maxwell ultra capacitors, or other, as yet unknown rapidly responsive energy storage means 116 etc., may suffice.

Conventional lead-acid batteries and massive steel flywheel systems cannot re-store energy nearly as rapidly as they discharge it. Consequently, such conventional hardware does not enable a multi-port DC bus coupled to a plurality of intermittent power sources and loads.

Responsive energy storage means 116 is coupled to the multi-port DC bus 108 and is configured to compensate for any drops in DC power on the multi-port DC bus 108. The responsive energy storage means 116 is shown coupled directly to the multi-port DC bus 108 because it is preferably integral to the UPS core 102. The ports 195 (*a-i*) are for external connections to the multi-port DC bus 108, as shown. Thus, if the utility AC power from the power grid 112 shuts off, responsive energy storage means 116 will maintain DC power on the multi-port DC bus 108 for a period deemed sufficient to bring backup generator 120 online. Backup generator 120, when in operation, produces AC power that is coupled along AC power line 119 to supply primary load 118. In an alternative use, backup generator 120 may produce AC power to sell to the commercial power grid 112, supplying that power along AC power line 176, through the reverse feed switch 114 to the power grid 112. Upon reading the teachings of this specification, those with ordinary skill in the art will now understand that, under appropriate circumstances, considering such issues as component cost, operational requirements, convenience, economics, user preference, etc., various configurations of responsive energy storage means 116, such as having multiple and/or various responsive energy storage means 116 coupled in series or parallel, etc., may be appropriate.

The multi-port DC bus 108 has a plurality of regulators 10 (*a-i*) to provide voltage regulation and current limiting between the multi-port DC bus 108 and various DC loads and sources. Each port 195(*a-i*) on the multi-port DC bus 108 may have a DC source, a DC load, or an element that is, at particular times, a source and, at other times, a load. Each port 195 (*a-i*) may include a regulator, such as one of regulators 10*a*-10*i*. The number of ports 195 (*a-i*) is not limited to the number shown in the FIGURE. Some ports 195 (*a-i*), such as port 195*h* coupled to electrical recharging station 152 by DC power line 121, port 195*c* coupled to electrolyzer 134 via DC power line 135, and port 195*e* coupled to DC motor-generator 146 via DC power line 181, provide temporally varying, or intermittent, loads to the multi-port DC bus 108. Such renewable energy power systems 100 are not feasible without responsive energy storage means 116 for leveling power on the multi-port DC bus 108. By gathering the power from all sources on the multi-port DC bus 108 in the UPS core 102 before conversion to AC power in the inverter 106, substantial reductions in infrastructure costs can be realized. Without a responsive energy storage means 116 with low operating costs, this approach would not be economically or technically feasible. Upon reading the teachings of this specification, those with ordinary skill in the art will now understand that, under appropriate circumstances, considering such issues as load characteristics, energy supply scheduling, operational requirements, convenience, economics, user preference, etc., various loads, such as AC loads with integral inverters, loads adaptable to scheduling and loads not adaptable to scheduling etc., may be incorporated.

DC output power line 135 couples DC power from port 195*c* to electrolyzer 134, which produces hydrogen gas from water and DC power. The hydrogen gas is coupled to low-pressure storage tank 140 over hydrogen gas conduit 139. Low-pressure hydrogen is pumped into high-pressure storage tank 148 though conduit 143, high-pressure pump 142, and hydrogen gas conduit 147. High-pressure pump 142 is mechanically coupled by drive shaft 160 to DC motor-generator 146, which is powered, in motoring mode, from the multi-port DC bus 108 along DC power line 181 coupled to port 195*e*. When high-pressure hydrogen is needed from tank 148, the hydrogen is conducted through conduit 149 to a variable-vane turbine 144, which extracts mechanical power from a pressure differential between the high-pressure hydrogen gas tank 148 and the destination such as hydrogen supply station 150 and/or hydrogen-fueled DC generator 136. The extracted mechanical power rotates shaft 160 to turn DC motor-generator 146 in generation mode to produce power for the multi-port DC bus 108 via power line 181 coupled to port 195*e*. Upon reading the teachings of this specification, those with ordinary skill in the art will now understand that, under appropriate circumstances, considering such issues as operational requirements, alternative fuels availability, convenience, economics, user preference, etc., various configurations for the hydrogen gas conduits 141, 139, 143, 147, 149, 191, 145, and 151, such as for supplying a hydrogen-fueled backup generator 120, etc., may be appropriate.

Hydrogen-fueled DC generator 136, which may be one or more fuel cells and/or a hydrogen-fueled motor driving a DC generator, produces DC power and supplies the DC power along DC power line 137 to port 195*d*, though regulator 10*d*, and to the multi-port DC bus 108. Hydrogen-fueled DC generator 136 is fueled either directly from low-pressure tank 140 via conduit 191 or through conduit 145 from the pressure-dropping variable-vane turbine 144. Hydrogen may also be transferred along conduit 151 from the pressure-dropping variable-vane turbine 144 to a hydrogen supply station 150 and though releasable hydrogen conduit 178 to a hydrogen-fueled vehicle 164, or though releasable hydrogen conduit 189 to supply fuel or lifting gas for an airship 162, or to other end users of hydrogen. If airship 162 is equipped with solar photovoltaic arrays on its hulls, then the airship may be a source of DC power to multi-port DC bus 108 via releasable DC power line 183, bi-directional coupling 154, and DC power line 123. Conversely, if the airship 162 requires DC power, it can be supplied along the reverse route. Electric vehicle 161 can be charged from the multi-port DC bus 108 via regulator 10h, port 195h, DC power line 121, and electrical recharging station 152. Upon reading the teachings of this specification, those with ordinary skill in the art will now understand that, under appropriate circumstances, considering such issues as operational requirements, alternative fuels availability, convenience, economics, user preference, etc., various releasable hydrogen conduits and releasable DC power lines, adapted for respective various vehicles or destinations, etc., may be appropriate.

DC power from photovoltaic (PV) array 122 may be supplied along power line 131 to port 195a and regulator 10a to the multi-port DC bus 108. The PV array 122 may be cooled by heat exchanger 124 through coolant circulation conduits 126 and 128. Waste heat may be collected in central plant 130 where it may be used to generate DC power using any means of alternative production 132. The DC power generated in the alternative production facility 132 is supplied along power line 133 coupled to port 195b and through regulator 10b to the multi-port DC bus 108. Alternative production facility 132 may include, without limitation, wind power, hydroelectric power, geothermal power, solar power, sterling engine, or biogas generators. Alternative production facility 132 may also produce hydrogen gas, which is transferred to low-pressure storage tank 140 along conduit 141. Upon reading the teachings of this specification, those with ordinary skill in the art will now understand that, under appropriate circumstances, considering such issues as, operational requirements, alternative fuels availability, convenience, economics, user preference, etc., that any alternative production facility 132, such as tide-powered generators, landfill reclamation gas-powered generators, sewer-gas generators, etc., may be appropriate.

The exemplary embodiment illustrates a fully integrated system that can receive energy from multiple sources, including intermittent sources, and produce stable energy outputs for a plurality of loads. In particular, the exemplary embodiment can provide a stand-alone capability for logistical support of lighter-than-air twin hull hybrid airships such as those disclosed by the present inventor in U.S. Pat. No. 6,843,448. For purposes other than supporting airships, alternative embodiments may be used. In various alternative embodiments adapted to respective various opportunities and environments, more or fewer alternative energy sources (but not fewer than one) and more or fewer energy loads may be preferred. For example, an isolated mountain town may make obvious variations in the design to avail itself of geothermal, wind, and hydroelectric sources and produce hydrogen as a prime mover fuel. In other embodiments, oxygen, which is a natural by-product of electrolyzing water in electrolizer 134, may be used to supply a hospital, for improving ventilation (e.g., mines), or for various other purposes for which oxygen is useful. In a particular embodiment, such as a system deriving alternative energy from a volcanic lava flow, the hydrogen production subsystem may be omitted to reduce risk.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A renewable energy power system comprising:
   at least one UPS having at least one multi-port DC bus;
   at least one responsive energy storage means electrically coupled to said at least one multi-port DC bus; and
   at least one motor-generator mechanically coupled to at least one variable-vane turbine and mechanically coupled to at least one high pressure hydrogen pump, wherein said at least one variable-vane turbine is configurable to drive said at least one motor-generator to produce DC power coupled to said at least one multi-port DC bus.

2. The renewable energy power system of claim 1, wherein said at least one UPS further comprises:
   at least one AC/DC converter operable to be coupled to an AC power line;
   at least one first coupling between said at least one AC/DC converter and said at least one multi-port DC bus;
   at least one DC/AC inverter and operable to be coupled to at least one primary AC load;
   at least one second coupling between said at least one inverter and said at least one multi-port DC bus;
   at least one third coupling between said at least one responsive energy storage means and said at least one multi-port DC bus;
   at least one exterior portion;
   a plurality of ports operable as external couplings to said at least one DC multi-port bus accessible from said at least one exterior portion of said at least one UPS and operable to couple various DC sources and various DC loads to said at least one multi-port DC bus; and
   at least one first voltage regulator in series between at least one first port of said plurality of ports and said multi-port DC bus, wherein said at least one first voltage regulator is operable to regulate the DC voltage to at least one DC load of said various DC loads to match the voltage on said at least one DC load of said various DC loads.

3. The renewable energy power system of claim 1, wherein said at least one responsive energy storage means is operable to supply DC electrical energy to said at least one multi-port DC bus during a first time period and to re-store electrical energy from said at least one multi-port DC bus during a second time period, wherein said second time period is approximately equal to said first time period.

4. The renewable energy power system of claim 3, wherein said at least one responsive energy storage means comprises at least one ultra capacitor.

5. The renewable energy power system of claim 1, further comprising at least one electrolyzer adapted to be electrically coupled to said at least one multi-port DC bus.

6. The renewable energy power system of claim 1, further comprising at least one renewable energy source adapted to be coupled to said at least one multi-port DC bus.

7. The renewable energy power system of claim 1, further comprising at least one of at least one intermittent DC load and at least one intermittent DC source adapted to be coupled to said at least one multi-port DC bus.

8. The renewable energy power system of claim 1, further comprising:
   at least one low-pressure hydrogen storage tank;
   at least one high-pressure hydrogen storage tank;
   at least one high-pressure hydrogen pump, operable to pump hydrogen from said at least one low-pressure hydrogen storage tank into said at least one high-pressure hydrogen storage tank;
   at least one variable-vane turbine, operable to extract mechanical energy from at least one pressure differential between high-pressure hydrogen and a lower-pressure destination; and
   at least one DC motor-generator mechanically coupled to said at least one variable-vane turbine and mechanically coupled to said at least one high pressure hydrogen pump, wherein said at least one motor-generator is coupled to said at least one multi-port DC bus and is operable in a first mode as a motor to drive said at least one high pressure hydrogen pump using power from said at least one multi-port DC bus and is operable in a second mode as a generator driven by said at least one variable-vane turbine to supply power to said at least one multi-port DC bus; and
   wherein said at least one low-pressure hydrogen storage tank is adapted to receive hydrogen gas from at least one of an electrolyzer powered by DC power from said at least one multi-port DC bus and an alternative production facility powered by waste heat from a photovoltaic array, and wherein said at least one low-pressure hydrogen storage tank is adapted to supply
   hydrogen to at least one of said at least one high-pressure hydrogen pump and at least one hydrogen-fueled generator; and
   wherein said at least one high-pressure hydrogen storage tank is adapted to receive high-pressure hydrogen from said at least one high-pressure hydrogen pump and adapted to supply high-pressure hydrogen to said at least one variable-vane turbine; and wherein said at least one variable-vane turbine is adapted to supply hydrogen to at least one of said at least one hydrogen-fueled generator and at least one hydrogen supply station.

9. The renewable energy power system of claim 1, further comprising at least one DC element coupled to said multi-port DC bus, wherein said at least one DC element is operable as at least one DC source during a particular period of time and is operable as at least one DC load during another particular period of time.

10. A renewable energy power system comprising:
   at least one UPS having at least one multi-port DC bus, said at least one multi-port DC bus having three necessary power couplings;
   at least one additional power coupling in addition to said three necessary power couplings, said at least one additional power coupling adapted to couple at least one external DC load and at least one external DC source to said at least one multi-port DC bus; at least one responsive energy storage means coupled to supply power to said at least one
   multi-port DC bus and operable to maintain a substantially constant power level on said at least one multi-port DC bus;
   at least one low-pressure hydrogen storage tank;
   at least one high-pressure hydrogen storage tank;
   at least one high-pressure hydrogen pump, operable to pump hydrogen from said at least one low-pressure hydrogen storage tank into said at least one high-pressure hydrogen storage tank;
   at least one variable-vane turbine, operable to extract mechanical energy from at least one pressure differential between high-pressure hydrogen and a lower-pressure destination; and
   at least one DC motor-generator mechanically coupled to said at least one variable-vane turbine and mechanically coupled to said at least one high pressure hydrogen pump, wherein said at least one motor-generator is coupled to said at least one multi-port DC bus and is operable in a first mode as a motor to drive said at least one high pressure hydrogen pump using power from said at least one multi-port DC bus and is operable in a second mode as a generator driven by said at least one variable-vane turbine to supply power to said at least one multi-port DC bus.

11. The renewable energy power system of claim 10, said at least one UPS having at least one exterior portion, said at least one UPS further comprising at least one plurality of ports on said at least one exterior portion of said at least one UPS, wherein at least one first port of said at least one plurality of ports couples to at least one regulator coupled to one additional power coupling of said at least one additional power coupling of said at least one multi-port DC bus.

12. The renewable energy power system of claim 11, wherein said plurality of ports comprises at least one second port, said system further comprising at least one electrolyzer coupled to said at least one second port of said plurality of ports, said at least one electrolyzer operable to produce hydrogen gas from DC power supplied by said at least one multi-port DC bus.

13. The renewable energy power system of claim 10, further comprising at least one hydrogen fueled generator, adapted to be fluidically coupled to at least one of said at least one variable-vane turbine and said at least one low-pressure hydrogen storage tank, and responsive to the presence of hydrogen to produce DC power on a DC power line adapted to be coupled to said at least one multi-port DC bus.

14. The renewable energy power system of claim 10, further comprising at least one hydrogen supply station adapted to be fluidically coupled to said at least one high-pressure hydrogen pump and operable to supply hydrogen to end users.

15. The renewable energy power system of claim 10, further comprising at least one electrical recharging station, adapted to be electrically coupled to said at least one multi-port DC bus and operable to recharge electrical vehicles.

16. The renewable energy power system of claim 10, further comprising a plurality of DC power sources and DC loads coupled to said multi-port DC bus.

17. The renewable energy power system of claim 10, further comprising at least one renewable-energy source adapted to be electrically coupled to said at least one multi-port DC bus.

18. A renewable energy power system comprising:
   at least one UPS having at least one multi-port DC bus;
   at least one exterior portion of said at least one UPS;
   at least one responsive energy storage means electrically coupled to said at least one multi-port DC bus; and
   at least one motor-generator mechanically coupled to at least one variable-vane turbine and mechanically coupled to at least one high pressure hydrogen pump, wherein said at least one variable-vane turbine is configurable to drive said at least one motor-generator to produce DC power coupled to said at least one multi-port DC bus.

19. The renewable energy power system of claim 18, further comprising:

at least one input converter coupled to said at least one multi-port DC bus and operable to be coupled to an AC power line;

at least one output inverter coupled to said at least one multi-port DC bus and operable to be coupled to at least one primary AC load;

a plurality of ports on said at least one DC multi-port bus accessible from said at least one exterior portion of said at least one UPS and operable to couple various DC sources and various DC loads to said at least one multi-port DC bus; and a plurality of voltage regulators, wherein at least one first voltage regulator of said plurality of voltage regulators is coupled in series between at least one first port of said plurality of ports and said at least one multi-port DC bus, wherein said at least one first voltage regulator is operable to regulate DC voltage to at least one DC load of said various DC loads.

20. The renewable energy power system of claim 19, further comprising at least one second voltage regulator in series between at least one second port of said plurality of ports and said at least one multi-port DC bus, wherein said at least one voltage second regulator is operable to regulate DC voltage from at least one DC source of said various DC sources to said at least one multi-port DC bus.

21. The renewable energy power system of claim 20, further comprising at least one port of said plurality of ports adapted to couple one of at least one intermittent DC load and at least one intermittent DC source to said at least one multi-port DC bus.

22. The renewable energy power system of claim 19, further comprising at least one external device which acts as at least one DC source during a particular time period and which acts as at least one DC load in another particular time period, wherein said at least one device is coupled through one port of said plurality of ports to said at least one voltage regulator and then to said at least one multi-port DC bus.

* * * * *